United States Patent [19]

Teratani et al.

[11] Patent Number: 5,571,350
[45] Date of Patent: Nov. 5, 1996

[54] PNEUMATIC TIRE WITH TREAD OF MATRIX FOAMED RUBBER CONTAINING RESIN

[75] Inventors: Hiroyuki Teratani; Masanori Aoyama, both of Tokyo, Japan

[73] Assignee: Bridgestone Corporation, Tokyo, Japan

[21] Appl. No.: 467,292

[22] Filed: Jun. 6, 1995

Related U.S. Application Data

[63] Continuation-in-part of Ser. No. 332,777, Nov. 1, 1994, abandoned.

[30] Foreign Application Priority Data

Nov. 2, 1993 [JP] Japan .................... 5-297274

[51] Int. Cl.⁶ .................. B60C 5/00; B60C 11/00
[52] U.S. Cl. ............ 152/209 R; 524/525; 524/526; 525/192; 525/232; 525/236; 525/237
[58] Field of Search ............ 152/209 R; 524/495, 524/525, 526; 525/192, 232, 236, 237

[56] References Cited

U.S. PATENT DOCUMENTS 5,147,477  9/1992  Mouri et al. ............ 152/209 R
5,302,636  4/1994  Takino et al. ............ 524/11

FOREIGN PATENT DOCUMENTS 517538    12/1992  European Pat. Off. .
1-118542   5/1989  Japan .
4-368205  12/1992  Japan .
5-295170  11/1993  Japan .

Primary Examiner—Robert E. Sellers
Attorney, Agent, or Firm—Sughrue, Mion, Zinn, Macpeak & Seas

[57] ABSTRACT

A pneumatic tire for all seasons comprises a tread provided with a foamed rubber containing a given amount of a particular resin such as crystalline syndiotactic 1,2 -polybutadiene having specified hardness and average particle size, and having specified expansion ratio, average expanded cell size and storage modulus (E') at −20° C. of a given range, and exhibits satisfactory braking and traction performances at not only dry-on-ice state but also wet-on-ice state while sufficiently holding the steering stability, durability and low fuel consumption in summer season.

3 Claims, No Drawings

PNEUMATIC TIRE WITH TREAD OF MATRIX FOAMED RUBBER CONTAINING RESIN

This is a continuation-in-part of application Ser. No. 08/332,777 filed Nov. 1, 1994 now abandoned.

BACKGROUND OF THE INVENTION

1. Field of the Invention

This invention relates to pneumatic tires, and more particularly to a pneumatic studless tire for all seasons having considerably improved traction performance, braking performance and steering performance in running on snow and ice road surfaces (hereinafter referred to as ice-snow performances simply) without degrading the steering stability, durability and wear resistance required in summer season.

2. Description of the Related Art

Recently, it is increasing to demand so-called all season tires capable of using in winter season likewise summer season without tire change. Even in the winter season, the tire of this type has the same dry gripping property, wet gripping property, steering property, durability and low fuel-consumption as in the summer season and further possesses sufficient traction and braking performances on ice and snow roads.

As a tread rubber used in the tire of this type, it is required to reduce a hardness at a low temperature in a tread rubber for summer season. In this connection, there is known a method of using a polymer having a low glass transition point, or a method of using a softening agent to properly maintain a modulus of elasticity at low temperature.

However, the former method develops substantially the performance on ice-snow temperature region owing to hysteresis property of the polymer, but has a problem that the braking performance and steering property on wet road surface and dry road surface are insufficient. The latter method is disclosed in JP-A-55-135149, JP-A-58-199203, JP-A-60-137945 and the like and has a problem that the use of softening agent badly affects the wear resistance and durability in the running on general-purpose road in comparison with the improvement of ice-snow performances.

In the aforementioned conventional techniques, the ice-snow performances at a relatively lower temperature region of not higher than −5° C. or so-called dry-on-ice state are certainly improved, but sufficient friction coefficient is not obtained in the ice-snow performances at a wet state near to 0° C. or so-called wet-on-ice state, so that it can not be said that the traction performance, braking performance and steering stability are sufficiently improved.

SUMMARY OF THE INVENTION

It is, therefore, an object of the invention to provide a pneumatic studless tire for true all seasons developing sufficient braking and traction performances at not only dry-on-ice state but also wet-on-ice state while sufficiently ensuring the steering stability, durability and low fuel consumption in summer season.

The inventors have made various studies with respect to the ice-snow performances of the tread rubber in the pneumatic studless tire for all seasons and found that the ice-snow performances can considerably be improved by mixing a matrix rubber composition for the formation of a tread portion with a special resin having given hardness and particle size and an affinity with the matrix rubber and setting a storage modulus (E') of the resulting matrix rubber composition to a given range as a foamed rubber having given expansion ratio and expanded cell size without degrading the performances such as steering stability, durability and the like required during the running in summer season or on usual road surface, and as a result, the invention has been accomplished.

According to the invention, there is the provision of a pneumatic tire, comprising a tread containing a foamed rubber; wherein said foamed rubber comprises a matrix rubber composition containing a resin having a Shore D hardness of not less than 40° and an average particle size of 10–400 μm, and the resin is capable of forming a polymer alloy with rubber in said matrix rubber composition or co-crosslinking with rubber in said matrix rubber composition and is present in the foamed rubber in an amount of 5–30 parts by weight per 100 parts by weight of rubber in said matrix rubber composition, and the foamed rubber has an expansion ratio of 5–30%, an average expanded cell size corresponding to 0.2–2 times the average particle size of the resin and a storage modulus (E') at −20° C. of $6.0 \times 10^7 - 20 \times 10^7$ dyn/cm$^2$.

DESCRIPTION OF THE PREFERRED EMBODIMENTS

As the resin used in the invention, mention may be made of synthetic resins having a melting point of at least 110° C. such as super-high molecular weight polyester resins having a molecular weight of 1,000,000–10,000,000 and capable of forming a polymer alloy with rubber ingredient, styrene-butadiene copolymer resins capable of co-crosslinking with rubber ingredient, and so on. Among them, a most preferable resin is a crystalline syndiotactic-1,2-polybutadiene resin having a melting point of not lower than 110° C. (hereinafter abbreviated as syn-1,2 PB simply) from a viewpoint of the improvement of the ice-snow performances.

As a polymerization catalyst for such syn-1,2 PB, mention may be made of catalyst system consisting of a soluble cobalt salt such as cobalt octoate, cobalt 1-naphthate, cobalt benzoate or the like, an organic aluminum compound such as trimethyl aluminum, triethyl aluminum, tributyl aluminum, triphenyl aluminum or the like and carbon disulfide, and so on. As a concrete polymerization method, use may be made of methods described in JP-B-53-39917, JP-B-54-5436 and JP-B-56-18005, but the invention is not particularly restricted to these methods.

In a preferred embodiment of the invention, a master batch of a resin composite having a particle size of 10–400 μm is previously formed by compounding 100 parts by weight of the resin with 0.3–5.0 parts by weight of sulfur and 0.1–7.0 parts by weight of a vulcanization accelerator, which is then compounded with a matrix rubber composition for the formation of a tread portion in the tire.

Moreover, the resin composite is favorable to be compounded with a scorch retarder and carbon black satisfying the following relationship:

$$0 < X + 10Y < 1300$$

(wherein X is a specific surface area of nitrogen adsorption (m$^2$/g) and Y is an amount (part by weight) of carbon black compounded per 100 parts by weight of the resin).

The resin composite can easily be formed by kneading in the conventional kneading machine such as kneader, Banbury mixer, rolls or the like at a temperature higher than the melting point of the resin and pulverizing up to a given particle size, so that special conditions are not required.

As the rubber ingredient in the matrix rubber composition for the formation of the tread portion, use may be made of all polymers usually used in the formation of the conventional pneumatic tire for all seasons, which includes, for example, a rubber blend of natural rubber and butadiene rubber, a rubber blend of natural rubber, butadiene rubber and styrene-butadiene rubber and so on.

The method of mixing the resin composite with the matrix rubber composition used in the formation of the tread portion is not particularly restricted. Similar results are obtained in a method of wet blending in a solvent, or in a method of dry blending through Banbury mixer or the like.

Moreover, the matrix rubber composition may properly be compounded with given amounts of additives usually used in the formation of the tread portion, e.g. inorganic filler such as silica or the like, softening agent such as aromatic oil, spindle oil or the like, antioxidant, vulcanization agent, vulcanization accelerator, accelerator promoter and so on.

In order to obtain a foamed rubber having the above specified expansion ratio and average expanded cell size according to the invention, the resulting rubber composition is compounded with a foaming agent and then heated under a pressure according to the usual manner for the manufacture of the tire. As the foaming agent, use may be made of azodicarbonamide, dinitrosopentamethylene tetramine, azobisisobutyronitrile, and aromatic sulfonyl-hydrazide compounds such as benzenesulfonylhydrazide, toluenesulfonylhydrazide, oxy-bis-benzenesulfonylhydrazide and the like. Among them, the use of azodicarbonamide is preferable in view of fine foaming. On the other hand, the use of dinitrosopentamethylene tetramine is favorable in view of large expanded cell size.

The resin used in the invention is required to have a Shore D hardness of not less than 40°, preferably not less than 70°. When the hardness is less than 40°, the sufficient scratching effect is not obtained. The concrete measurement of Shore D hardness is according to JIS K-7215.

Furthermore, the resin or resin composite is required to have an average particle size of 10–400 µm. When the average particle size is less than 10 µm, the improvement of ice-snow performances aiming at the invention is insufficient, while when it exceeds 400 µm, the effect of improving the ice-snow performances is observed to a certain extent, but the wearing and cracking at groove bottom are undesirably caused to degrade the other performances required in the tire.

Moreover, the resin is generally crystalline and the crystalline portion thereof is required to have a melting point of not lower than 110° C. When the melting point is lower than 110° C., the resin is softened or deformed, or a part or whole of the resin is melted when the resin is charged and kneaded in form of the resin composite and hence the desired particle size cannot be maintained and it is difficult to obtain the improving effect of the ice-snow performances.

In the invention, the resin or resin composite is required to be compounded with the matrix rubber composition for the formation of the tread portion in an amount of 5–30 parts by weight based on 100 parts by weight of rubber ingredient. When the compounding amount is less than 5 parts by weight, the improving effect of the ice-snow performances is hardly recognized, while when it exceeds 30 parts by weight, the other performances required in the tire such as wear resistance and the like are considerably degraded and also the processability in the manufacture of the tire is remarkably poor and hence the resulting tire can not put into practical use.

According to the invention, the rubber constituting the tread portion is a foamed rubber in order to provide excellent ice-snow performances, which is required to have an expansion ratio of 5–30%. When the expansion ratio is less than 5%, the foaming effect is insufficient, while when it exceeds 30%, the rigidity of the tread portion becomes insufficient and hence the degradation of the wear resistance and the occurrence of cracks at the groove bottom become large.

Furthermore, the average expanded cell size of the foamed rubber and the average particle size of the resin or resin composite are required to satisfy a relation that the average expanded cell size is 0.2–2 times of the average particle size. When the ratio exceeds 2 times, the desired ice-snow performances are not obtained, while when it is less than 0.2 times, the degradation of wear resistance is large. The ratio is preferably within a range of 0.25–1 times, more particularly within a range of 0.4–0.7 times.

According to the invention, the foamed rubber for the tread portion is required to have a storage modulus (E') at $-20°$ C. of $6.0 \times 10^7 - 20 \times 10^7$ dyn/cm$^2$, preferably $8.0 \times 10^7 - 12 \times 10^7$ dyn/cm$^2$ by controlling the compounding recipe of the rubber composition or the foaming conditions. When the storage modulus is less than $6.0 \times 10^7$ dyn/cm$^2$, blocks constituting the tread pattern are deformed or sipes are opened to bring about the degradation of the ice-snow performances. While, when it exceeds $20 \times 10^7$ dyn/cm$^2$, the ground contact area of the tread portion decreases to degrade the ice-snow performances.

In the formation of the resin composite according to the invention, when the amount of sulfur compounded is less than 0.3 part by weight, the crosslinking bond between the resin and rubber in the matrix rubber composition is not sufficiently obtained, while when it exceeds 5.0 parts by weight, the processability in the formation of the resin composite is considerably degraded.

Furthermore, when the amount of vulcanization accelerator compounded is less than 0.1 part by weight, the adhesion property through crosslinking is insufficient, while when it exceeds 7.0 parts by weight, there is caused a problem on the processability. The amount is preferably within a range of 0.3–5.0 parts by weight.

When carbon black is compounded with the resin composite, if the value of $X+10Y$ (X is a specific surface area of nitrogen adsorption (m$^2$/g) and Y is an amount (part by weight) of carbon black compounded per 100 parts by weight of the resin) exceeds 1300, the processability in the formation of the resin composite is considerably degraded.

In a preferable embodiment of the invention, the resin composite is previously formed by using particular carbon black, sulfur and vulcanization accelerator as mentioned above. Thus, the crosslinking bond between the resin and rubber in the matrix rubber composition for the formation of the tread portion is sufficiently carried out, whereby the resin is hardly peeled off from the tread portion and hence the improving effect of the ice-snow performances becomes conspicuous.

The following examples are given in illustration of the invention and are not intended as limitations thereof.

At first, syn-1,2 PB resin is prepared as follows.

Into an autoclave of 2 liters in capacity purged with nitrogen gas is charged 760 cc of dehydrated benzene and then 74 g of 1,3-butadiene is dissolved thereinto. To the resulting solution is added 1 mmol of cobalt octoate (use of benzene solution having a concentration of 1 mmol/cc) and 2 mmol of triethyl aluminum (benzene solution having a concentration of 1 mmol/cc) is added after 1 minute and then a proper amount of acetone is added with stirring. After 1 minute, 0.6 mmol of carbon disulfide (benzene solution having a concentration of 0.3 mmol/cc) is added and then the stirring is continued at 10° C. for 60 minutes to conduct polymerization of 1,3-butadiene.

To the resulting solution of syn-1,2 PB resin is added 0.75 g of 2,4-ditartiary-butyl-p-cresol, which is then poured into 1000 cc of methanol to precipitate syn-1,2 PB resin. Next, syn-1,2 PB resin is washed with methanol and dried under vacuum after the filtration of methanol.

The thus obtained syn-1,2 PB resin is kneaded together with carbon black according to a compounding recipe shown in Table 1 in a laboplastomill of 250 cc at a temperature higher than the melting point of the resin for 1 minute, added with sulfur, vulcanization accelerator and scorch retardant and further kneaded for 30 seconds. The thus obtained syn-1,2 PB resin composite is pulverized according to usual manner to obtain syn-1,2 PB resin composite (A-H) having an average particle size shown in Table 1.

b) Expansion ratio

The expansion ratio VS is represented by the following equation (1):

$$V_S = \{(\rho_0 - \rho_g)/(\rho_1 - \rho_g) - 1\} \times 100 (\%) \quad (1)$$

in which $\rho_1$ is a density of foamed rubber (g/cm$^3$), $\rho_0$ is a density of a solid phase portion in foamed rubber (g/cm$^3$), and $\rho_g$ is a density of gas phase portion in cells of foamed rubber (g/cm$^3$). The foamed rubber is composed of the solid phase portion and cavity (closed cell) defined by the solid phase portion or the gas phase portion in cell. The density $\rho_g$ of the gas phase portion is very small as compared with the density $\rho_1$ of the solid phase portion and near to zero, so that the equation (1) can be represented by the following equation (2):

$$V_S = (\rho_0/\rho_1 - 1) \times 100 (\%) \quad (2)$$

TABLE 1

| | Properties of syn-1,2PB resin composite | | Compounding recipe of syn-1,2PB resin composite | | | | | |
|---|---|---|---|---|---|---|---|---|
| | average particle size (μm) | melting point of crystalline resin (°C.) | X: N$_2$SA (m$^2$/g) | Y: amount compounded (parts by weight) | X + 10Y | sulfur amount compounded (parts by weight) | vulcanization accelerator 1) amount compounded (parts by weight) | scorch retardant amount compounded (parts by weight) |
| A | 20 | 170 | 83 | 50 | 583 | 1.5 | 1.0 | 0.3 |
| B | 40 | 170 | 83 | 50 | 583 | 1.5 | 1.0 | 0.3 |
| C | 60 | 170 | 83 | 50 | 583 | 1.5 | 1.0 | 0.3 |
| D | 100 | 170 | 83 | 50 | 583 | 1.5 | 1.0 | 0.3 |
| E | 150 | 170 | 83 | 50 | 583 | 1.5 | 1.0 | 0.3 |
| F | 220 | 170 | 83 | 50 | 583 | 1.5 | 1.0 | 0.3 |
| G | 5 | 170 | 83 | 50 | 583 | 1.5 | 1.0 | 0.3 |
| H | 15 | 170 | 83 | 50 | 583 | 1.5 | 1.0 | 0.3 |

1) N-oxydiethylene-2-benzothiazolyl sulfenamide

The specific surface area of nitrogen adsorption in carbon black N$_2$SA in Table 1 is measured according to a method of ASTM D3037-84.

EXAMPLES 1–14, COMPARATIVE EXAMPLES 1–9

A rubber composition for the formation of tread portion is prepared by using the above syn-1,2 PB resin composite according to compounding recipe shown in Tables 2 and 3, and the storage modulus (E') at −20° C. of the resulting rubber composition is measured. Then, a test tire having a tire size of PSR165SR13 is manufactured by using the rubber composition as a tread rubber, and thereafter the expansion ratio, average expanded cell size, braking performance on ice and wear resistance are measured with respect to this test tire.

The above measurements are as follows.
a) Storage modulus (E')

A slab sheet is made from the rubber composition under curing conditions of 160° C. ×15 minutes, from which a specimen having a gauge of 2 mm, a width of 5 mm and a length of 20 mm is cut out. The storage modulus of the specimen is measured by using a spectrometer made by Iwamoto Seisakusho under conditions that initial load is 150 g, dynamic strain is 1%, frequency is 50 Hz and setting temperature is −20° C.

Actually, a block sample is cut out from the foamed rubber in the tread portion of the test tire after being cured and left to stand over a week, from which a specimen of 5 mm in thickness is cut out to measure the density. Separately, the density of the unfoamed rubber (solid phase portion) is measured. Thereafter, the expansion ratio $V_S$ is determined from the measured values according to the equation (2).

c) Average expanded cell size and resin particle size

A block sample is cut out from the foamed rubber in the tread portion of the test tire and photographed by means of an optical microscope with a magnification of 100–400, from which diameters of 200 or more closed cells are measured and then the average expanded cell size is calculated from the measured values on average. Further, the particle size of the resin is represented as an average value by measuring particle sizes of 200 or more resin particles in the block sample by means of an optical microscope in the same manner as described above.

d) Braking performance on ice

The test tire is first trained over a distance of 50 km and then subjected to the following test.

At first, 4 test tires are mounted onto a passenger car having a displacement of 1500 cc and run on ice at a temperature of −5° C. to measure a braking distance. The braking performance is represented by an index value on the basis that the tire of Comparative Example 1 is 100. The larger the index value, the better the braking.

e) Wear resistance

After the training, 2 test tires are mounted onto a driving shaft of a passenger car having a displacement of 1500 cc and run on concrete road surface of a test circuit at a give speed over a given distance. Then, a quantity of groove depth changed is measured and represented by an index value on the basis that the tire of Comparative Example 1 is 100. The larger the index value, the better the wear resistance.

The thus obtained results are shown in Tables 2 and 3.

TABLE 2

| | Comparative Example 1 | Example 1 | Example 2 | Example 3 | Comparative Example 2 | Example 4 | Example 5 | Comparative Example 3 | Comparative Example 4 | Example 6 | Example 7 | Comparative Example 5 |
|---|---|---|---|---|---|---|---|---|---|---|---|---|
| Compounding recipe (parts by weight) | | | | | | | | | | | | |
| natural rubber | 40 | 40 | 40 | 40 | 40 | 40 | 40 | 40 | 40 | 40 | 40 | 40 |
| butadiene rubber | 60 | 60 | 60 | 60 | 60 | 60 | 60 | 60 | 60 | 60 | 60 | 60 |
| carbon black N220 | 60 | 50 | 50 | 50 | 40 | 45 | 55 | 60 | 50 | 50 | 50 | 55 |
| process oil | — | — | — | — | — | — | — | — | 3.0 | 1.5 | 1.0 | — |
| stearic acid | 1.5 | 1.5 | 1.5 | 1.5 | 1.5 | 1.5 | 1.5 | 1.5 | 1.5 | 1.5 | 1.5 | 1.5 |
| zinc white | 3.0 | 3.0 | 3.0 | 3.0 | 3.0 | 3.0 | 3.0 | 3.0 | 3.0 | 3.0 | 3.0 | 3.0 |
| antioxidant | 1.0 | 1.0 | 1.0 | 1.0 | 1.0 | 1.0 | 1.0 | 1.0 | 1.0 | 1.0 | 1.0 | 1.0 |
| vulcanization accelerator DM 2) | 0.2 | 0.2 | 0.2 | 0.2 | 0.2 | 0.2 | 0.2 | 0.2 | 0.2 | 0.2 | 0.2 | 0.2 |
| vulcanization accelerator CZ 3) | 0.5 | 0.5 | 0.5 | 0.5 | 0.5 | 0.5 | 0.5 | 0.5 | 0.5 | 0.5 | 0.5 | 0.5 |
| sulfur | 1.0 | 1.0 | 1.0 | 1.0 | 1.0 | 1.0 | 1.0 | 1.0 | 1.0 | 1.0 | 1.0 | 1.0 |
| foaming agent (DPT/urea) 4) | 5.2 | 5.0 | 5.0 | 5.0 | 4.6 | 4.8 | 5.2 | 5.5 | 4.0 | 4.4 | 4.8 | 6.0 |
| syn-1,2PB resin composite | — | 20 | 20 | 20 | 20 | 20 | 20 | 20 | 20 | 20 | 20 | 20 |
| (kind) | | (C) | (D) | (E) | (C) | (C) | (C) | (C) | (C) | (C) | (C) | (C) |
| Storage modulus (E') ($\times 10^7$ dyn/cm$^2$) | 9.0 | 9.0 | 9.0 | 9.0 | 5.0 | 7.0 | 15.0 | 22.0 | 9.0 | 9.0 | 9.0 | 9.0 |
| Expansion ratio Vs | 20 | 20 | 20 | 20 | 20 | 20 | 20 | 20 | 3 | 10 | 15 | 35 |
| Average expanded cell size (μm) | 60 | 60 | 60 | 60 | 60 | 60 | 60 | 60 | 60 | 60 | 60 | 60 |
| Braking performance on ice | 100 | 123 | 130 | 122 | 95 | 125 | 115 | 91 | 100 | 123 | 127 | 131 |
| Wear resistance | 100 | 101 | 100 | 100 | 90 | 100 | 105 | 108 | 103 | 101 | 100 | 88 |

2) dibenzothiazyl disulfide
3) N-cyclohexyl-2-benzothiazyl sulfenamide
4) Mixture of dinitrosopentamethylene tetramine and urea with a mixing ratio of 57:43

TABLE 3

| | Example 8 | Example 9 | Example 10 | Example 11 | Comparative Example 6 | Comparative Example 7 | Example 12 | Example 13 | Comparative Example 8 | Comparative Example 9 | Example 14 |
|---|---|---|---|---|---|---|---|---|---|---|---|
| Compounding recipe (parts by weight) | | | | | | | | | | | |
| natural rubber | 40 | 40 | 40 | 40 | 40 | 40 | 40 | 40 | 40 | 40 | 40 |
| butadiene rubber | 60 | 60 | 60 | 60 | 60 | 60 | 60 | 60 | 60 | 60 | 60 |
| carbon black N220 | 50 | 50 | 50 | 50 | 50 | 60 | 54 | 44 | 35 | 50 | 50 |
| process oil | — | — | — | — | — | — | — | — | — | — | — |
| stearic acid | 1.5 | 1.5 | 1.5 | 1.5 | 1.5 | 1.5 | 1.5 | 1.5 | 1.5 | 1.5 | 1.5 |
| zinc white | 3.0 | 3.0 | 3.0 | 3.0 | 3.0 | 3.0 | 3.0 | 3.0 | 3.0 | 3.0 | 3.0 |
| antioxidant | 1.0 | 1.0 | 1.0 | 1.0 | 1.0 | 1.0 | 1.0 | 1.0 | 1.0 | 1.0 | 1.0 |
| vulcanization accelerator DM | 0.2 | 0.2 | 0.2 | 0.2 | 0.2 | 0.2 | 0.2 | 0.2 | 0.2 | 0.2 | 0.2 |
| vulcanization accelerator CZ | 0.5 | 0.5 | 0.5 | 0.5 | 0.5 | 0.5 | 0.5 | 0.5 | 0.5 | 0.5 | 0.5 |
| sulfur | 1.0 | 1.0 | 1.0 | 1.0 | 1.0 | 1.0 | 1.0 | 1.0 | 1.0 | 1.0 | 1.0 |
| foaming agent (DPT/urea) 4) | — | — | — | — | — | 5.0 | 5.0 | 5.0 | 5.0 | — | — |
| foaming agent ADCA 5) | 4.7 | 4.7 | 4.7 | 4.7 | 4.7 | — | — | — | — | 4.7 | 4.7 |
| urea | 2.5 | 2.5 | 2.5 | 2.5 | 2.5 | — | — | — | — | 2.5 | 2.5 |
| syn-1,2PB resin composite | 20 | 20 | 20 | 20 | 20 | 3 | 8 | 30 | 40 | 20 | 20 |
| (kind) | (A) | (B) | (C) | (D) | (F) | (D) | (D) | (D) | (D) | (G) | (H) |
| Storage modulus (E') | 9.0 | 9.0 | 9.0 | 9.0 | 9.0 | 9.0 | 9.0 | 9.0 | 9.0 | 9.0 | 9.0 |

TABLE 3-continued

| | Example 8 | Example 9 | Example 10 | Example 11 | Comparative Example 6 | Comparative Example 7 | Example 12 | Example 13 | Comparative Example 8 | Comparative Example 9 | Example 14 |
|---|---|---|---|---|---|---|---|---|---|---|---|
| ($\times 10^7$ dyn/cm$^2$) | | | | | | | | | | | |
| Expansion ratio Vs | 20 | 20 | 20 | 20 | 20 | 20 | 20 | 20 | 20 | 20 | 20 |
| Average expanded cell size (μm) | 30 | 30 | 30 | 30 | 30 | 60 | 60 | 60 | 60 | 30 | 30 |
| Braking performance on ice | 115 | 125 | 123 | 110 | 109 | 100 | 110 | 132 | 128 | 102 | 110 |
| Wear resistance | 101 | 101 | 100 | 100 | 86 | 100 | 100 | 100 | 89 | 101 | 101 |

4) the same in Table 2
5) azodicarbonamide

As mentioned above, in the pneumatic tire according to the invention, the tread rubber is constituted with a foamed rubber containing a given amount of a particular resin having specified hardness and average particle size, and having specified expansion ratio, average expanded cell size and storage modulus (E') at −20° C. of a given range, whereby satisfactory braking and traction performances at not only dry-on-ice state but also wet-on-ice state are exhibited to provide excellent ice-snow performances while sufficiently holding the steering stability, durability and low fuel consumption in summer season.

What is claimed is:

1. A pneumatic tire, comprising a tread containing a foamed rubber; wherein said foamed rubber comprises a matrix rubber composition containing a crystalline syndiotactic 1,2-polybutadiene with a melting point of not lower than 110° C. and a resin having a Shore D hardness of not less than 40° and an average particle size of 10–400 μm, and the resin is capable of forming a polymer alloy with rubber in said matrix rubber composition or co-crosslinking with rubber in said matrix rubber composition and is present in the foamed rubber in an amount of 5–30 parts by weight per 100 parts by weight of rubber in the matrix rubber composition, and the foamed rubber has an expansion ratio of 5–30%, an average expanded cell size corresponding to 0.2–2 times the average particle size of the resin and a storage modulus (E') at −20° C. of 6.0×10$^7$–20×10$^7$ dyn/cm$^2$.

2. The pneumatic tire according to claim 1, wherein said resin is compounded with 0.3–5.0 parts by weight of sulfur and 0.1–7.0 parts by weight of a vulcanization accelerator based on 100 parts by weight of the resin to form a resin composite having a particle size of 10–400 μm and the resulting resin composite is compounded with the matrix rubber composition.

3. The pneumatic tire according to claim 2, wherein said resin composite is compounded with carbon black satisfying the following relationship:

$$0 < X + 10Y < 1300$$

(wherein X is a specific surface area of nitrogen adsorption (m$^2$/g) and Y is an amount (part by weight) of carbon black compounded per 100 parts by weight of the resin).

* * * * *